United States Patent [19]

Greene, Sr. et al.

[11] Patent Number: 5,926,763
[45] Date of Patent: *Jul. 20, 1999

[54] CELLULAR COMMUNICATION SYSTEM WITH VOICE CHANNEL USAGE BIASING

[75] Inventors: Gregory A. Greene, Sr., Seffner, Fla.; Robert L. Littler, II, Norcross, Ga.; Michael E. Nail, Lutz, Fla.; Kevin M. Graham, Nashville, Tenn.; Alan B. Jennison, Zephyrhills, Fla.

[73] Assignee: GTE Mobile Communications Service Corporation, Atlanta, Ga.

[*] Notice: This patent issued on a continued prosecution application filed under 37 CFR 1.53(d), and is subject to the twenty year patent term provisions of 35 U.S.C. 154(a)(2).

[21] Appl. No.: 08/694,961

[22] Filed: Aug. 9, 1996

[51] Int. Cl.⁶ .................................................. H04Q 7/20
[52] U.S. Cl. ........................... 455/450; 455/62; 455/442; 455/512
[58] Field of Search ................................ 455/62, 63, 442, 455/447, 450, 451, 452, 453, 454, 455, 435, 509, 512, 513

[56] References Cited

U.S. PATENT DOCUMENTS

| | | | |
|---|---|---|---|
| 4,670,899 | 6/1987 | Brody et al. | 455/453 |
| 5,038,399 | 8/1991 | Bruckert | 455/447 |
| 5,134,709 | 7/1992 | Bi et al. | 455/452 |
| 5,148,548 | 9/1992 | Meche et al. | 455/62 |
| 5,355,367 | 10/1994 | Comroe et al. | 455/447 |
| 5,430,761 | 7/1995 | Bruckert et al. | 455/454 |
| 5,437,054 | 7/1995 | Rappaport et al. | 455/447 |
| 5,448,621 | 9/1995 | Knudsen | 455/452 |
| 5,483,666 | 1/1996 | Yamada et al. | 455/62 |
| 5,513,379 | 4/1996 | Benveniste et al. | 455/451 |
| 5,570,411 | 10/1996 | Sicher | 455/450 |
| 5,603,085 | 2/1997 | Shedlo | 455/33.1 |
| 5,666,655 | 9/1997 | Ishikawa et al. | 455/452 |
| 5,726,978 | 3/1998 | Frodigh et al. | 455/63 |
| 5,859,841 | 3/1995 | Gitlits | 370/335 |

OTHER PUBLICATIONS

Andreas Gamst, et al. "On Frequency assignment In Mobile Automatic Telephone Systems," 1982, pp. 309–315, IEEE.
J. Plehn, "Applied Frequency Assignment," 1994, pp. 853–857, IEEE.
Kumar N. Sivarajan, Robert J. McEliece, John W. Ketchum–Channel Assignment in Cellular Radio, 1989, pp. 846–850.
William C.Y. Lee–Mobile Cellular Telecommunications 1995–pp. 266–281.
Frank Box–A Heuristic Technique for Assigning Frequencies to Mobile Radio Nets–1978–pp. 57–64.
H. Sekiguchi, et al.–Techniques For Increasing Frequency Spectrum Utilization in Mobile Radio Communication System–1985–pp. 26–31.
Lewis G. Anderson–A Simulation Study of Some Dynamic Channel Assignment Algorithms in a High Capacity Mobile Telecommunications System–Nov. 1973–pp. 210–217.

(List continued on next page.)

*Primary Examiner*—Reinhard J. Eisenzopf
*Assistant Examiner*—Lester G. Kincaid
*Attorney, Agent, or Firm*—Leonard Charles Suchyta

[57] ABSTRACT

A cellular communication system (10) includes any number of land stations (12), each of which controls a cell (14). When channels are assigned to cells (14), a figure of merit which predicts potential voice quality, such as C/I, is determined (34) for each channel/cell assignment. The assigned channels and associated figures of merit are distributed to corresponding land stations (14) to make channel-to-cell assignments. When a call arises in a cell (14) a channel is selected for assignment to the call. The channel is selected from channels assigned during the channel-to-cell assignment phase. A channel assignment algorithm (68) ensures that potentially lower quality channels (20) are the least used channels at the cell (14). When potentially lower quality channels (20) are assigned to calls, the calls are handed off to potentially higher quality channels (18) as soon as potentially higher quality channels (18) become available.

21 Claims, 4 Drawing Sheets

OTHER PUBLICATIONS

Donald C. Cox et al. –Increasing Channel Occupancy in Large–Scale Mobile Radio Systems: Dyanmic Channel Reassignment–Jun. 1972–pp. 218–222.

Tomson Joe Kahwa et al.–A Hybrid Channel Assignment Scheme in Large–Scale, Cellular–Structured Mobile Communication Systems–1978–pp. 432–438.

Zuoying Xu et al.–Virtually Fixed Channel Assignment for Cellular Radio–Telephone Systems: A Model and Evaluation–1992–pp. 1037–1041.

M. Grevel et al.–A Graph Theoretical Analysis of Dynamic Channel Assignment Algorithms for Mobile Radiocommunication Systems–1983–pp. 298–305.

CELLULAR COMMUNICATION SYSTEM WITH VOICE CHANNEL USAGE BIASING

TECHNICAL FIELD OF THE INVENTION

The present invention relates generally to cellular radiotelephony. More specifically, the present invention relates to the assignment of cellular channels to cells and to calls as call requests arise in the cells so that the usage of channels favors certain channels over other channels.

BACKGROUND OF THE INVENTION

As cellular radiotelephony has become more popular, cellular service providers have felt increasingly pressured to use the cellular RF spectrum as efficiently as possible. Greater efficiency allows a service provider to carry more calls using a given amount of RF spectrum. However, the cellular industry generally accepts that when a channel is assigned to a first call, that channel and other channels should not be assigned to other calls in a manner which will cause interference with the first call. Accordingly, interference potential causes service providers to impose constraints on channel usage which limit the efficient usage of spectrum.

The cellular industry has relied upon interference measurement parameters, such as carrier-to-interference (C/I) ratio, to indicate the interference potential of particular channel assignment patterns. Typically, when the C/I ratio for a given channel used in a given cell exceeds a predetermined minimum, typically set at about 18 dB, voice quality is deemed acceptable. Hence, channels are assigned to cells in a manner which ensures that each channel in each cell will meet or exceed a minimum predetermined C/I ratio, assuming all channels are concurrently in use. Other constraints, such as a minimum reuse distance, adjacent channel constraints and co-site constraints, that are consistent with exceeding the minimum predetermined C/I ratio may be also be imposed. As long as established constraints are met, each channel is assigned to as many cells as possible within a cellular system, and voice quality remains acceptable even if all channels are concurrently used wherever they may be assigned throughout the cellular system.

Spectrum usage efficiency improvements may be achieved by devising channel assignment schemes that allow more channels to be used in each cell. A variety of conventional channel assignment schemes have been devised with the aim of efficiently using the RF spectrum. A fixed channel assignment (FCA) scheme is commonly used. In fixed channel assignment, constraints are established consistent with exceeding some minimum predetermined C/I ratio. Channels are assigned to as many cells as possible within a system in a manner which makes all channel assignments consistent with the constraints. The channel-to-cell assignments are maintained for a relatively long period of time (i.e. typically much longer than the duration of a call). As call requests arise in the cells where channels are assigned, the channels are assigned to the calls. When calls terminate or are handed off to other cells, the channels used to service the calls remain assigned to their cells.

A dynamic channel assignment (DCA) scheme may take a pure or hybrid form. With pure DCA, all channels are held in a central pool until a call request arises in a particular cell. At that instant, a channel is selected from the central pool and simultaneously assigned to the cell and the call. The selected channel meets predetermined assignment constraints. For example, a channel may be selected from the central pool of channels only if it exceeds the minimum predetermined C/I ratio. Hybrid DCA is a hybrid of FCA and pure DCA. Some channels are assigned to cells indefinitely using FCA and others are assigned as the need arises using DCA. Both pure and hybrid forms of DCA achieve spectrum efficiency over FCA. Pure DCA achieves the most improvement in spectrum efficiency when intra-cell handoffs are allowed.

A channel borrowing assignment scheme indefinitely assigns channels to cells independent of call activity, in a manner similar to FCA. When all assigned channels in a cell are used, the next call may be assigned to a channel borrowed from a nearby cell. However, before a channel may be borrowed from a nearby cell, that channel must not currently be in use or otherwise locked from being borrowed. If a channel is borrowed, that channel is then locked to prevent its use in the borrowed-from cell to ensure that the minimum predetermined C/I ratio will be maintained. When the borrowed channel is released in the borrowing cell, the channel is unlocked in the borrowed-from cell.

An underlay/overlay channel assignment scheme also indefinitely assigns channels to cells independently of call activity, in a manner similar to FCA. Large overlaid cells share radio coverage area with small underlaid cells but have different channels assigned thereto to prevent interference. Due to the small size of the underlaid cells, the channels assigned thereto may be reused at smaller distances than the channels assigned to the larger overlaid cells while maintaining the same minimum predetermined C/I ratio. The underlay/overlay scheme combines a high-power and less spectrally efficient cellular system with a low power and more spectrally efficient cellular system. Calls are handed off between the two systems.

In a related technique, a cell site may measure interfering signals present on a channel immediately prior to assigning a call to the channel. If, in spite of any channel to cell assignment scheme, interference appears to be below the threshold acceptability level (i.e. a C/I ratio of <18 dB), that channel is not assigned.

Each of the above-discussed conventional channel assignment schemes identifies a channel which may be assigned to a call. That channel may come from a central pool, be borrowed from a nearby cell or be assigned to an underlay/overlay cell. From the perspective of the service provider, each channel provides acceptable voice quality and is therefore indistinguishable on the basis of voice quality from other channels which might have been assigned. Measurements may be taken to confirm that voice quality will be acceptable. Any channel assigned to a call provides acceptable voice quality up to the point where all channels, including all borrowed channels and underlaid or overlaid channels which share radio coverage area, are in use. At that point, the next call is blocked because communication services cannot be provided to the next call. If interference measurements indicate too much interference on a channel, that channel will not be assigned to a call even if the result is call blockage.

The conventional channel assignment schemes are undesirable because they achieve only a limited amount of spectral usage efficiency over FCA. In addition, such schemes are undesirable because they fail to gracefully degrade communication service as communication traffic increases. Rather, they all achieve roughly equivalent service quality up to the point of call blockage, at which point they fail to provide communication services for blocked calls.

SUMMARY OF THE INVENTION

Accordingly, it is an advantage of the present invention that a cellular communication system with voice channel usage biasing is provided.

Another advantage is that a cellular communication system which achieves significant spectral usage efficiency over FCA is provided.

Another advantage is that a cellular communication system which gracefully degrades communication service in the presence of high communication traffic rather than blocking calls is provided.

Another advantage is that a cellular communication system which handles an increased amount of call traffic with an insubstantial degradation in service quality is provided.

Another advantage is that the cellular system implements a channel assignment technique which ensures that when a certain channel is in use in one cell it is unlikely to be in use in other cells so that potential interference consequences are unlikely to be realized.

The above and other advantages of the present invention are carried out in one form by a method of channel usage biasing. The method is carried out in a cellular communication system in which voice channels are assigned to cells and to calls as call requests arise in the cells. The method calls for assigning voice channels to a land station having one of the cells associated therewith. Channels which have a potentially higher voice quality are distinguished from channels which have a potentially lower voice quality. The potentially higher quality voice channels are assigned to calls arising at the land station before the potentially lower quality voice channels.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
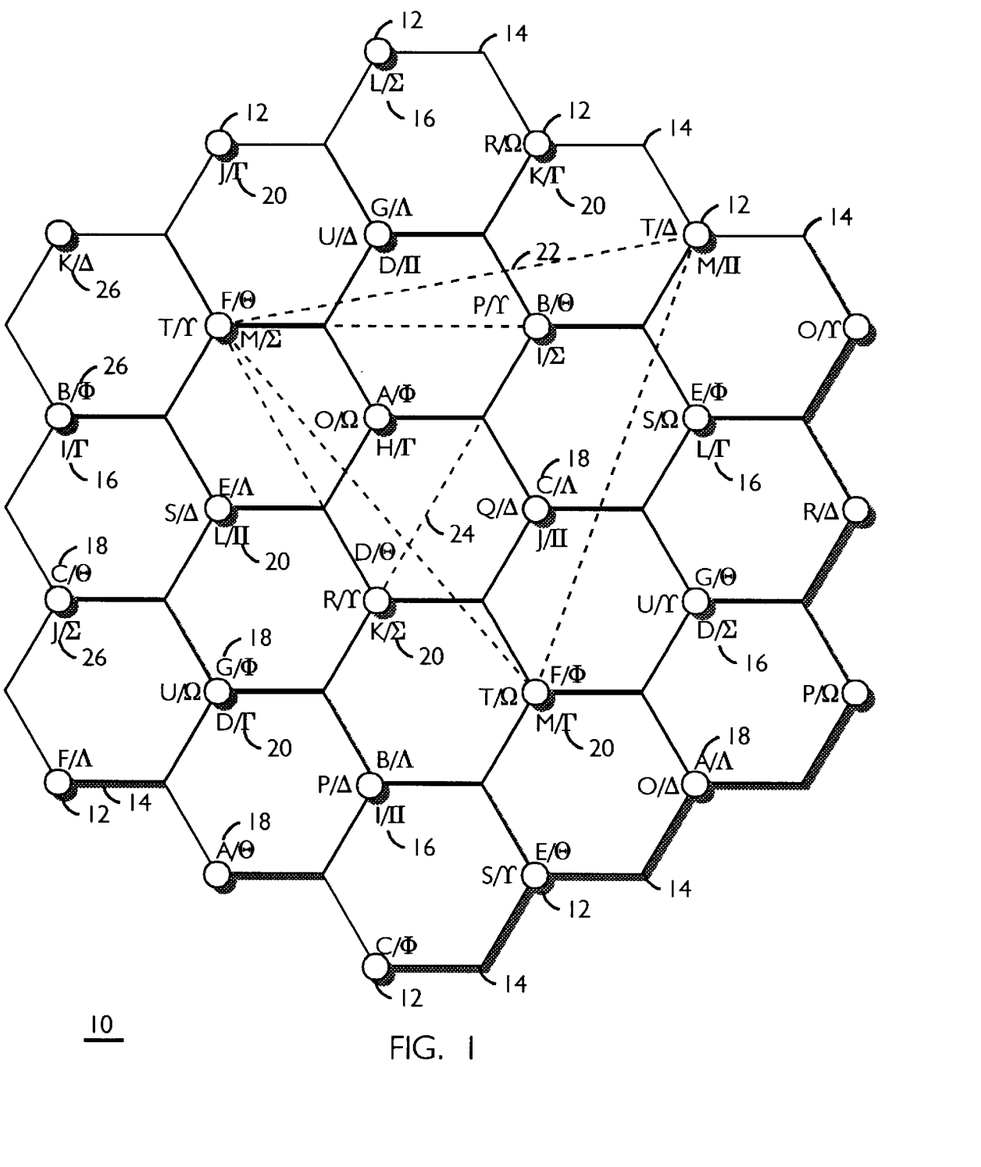
FIG. 1 shows a schematic layout diagram of an exemplary cellular RF communication system.

FIG. 1 shows a schematic layout diagram of an exemplary cellular RF communication system 10. System 10 includes any number of land stations 12. Each land station 12 controls at least one cell 14 or a face or sector of a cell 14. For purposes of the present description, the term "cell" hereinafter applies both to an entire cell and to an individual face or sector of a cell. Land stations 12 may couple to mobile telephone switching offices (not shown) in a manner well known in the art.

FIG. 1 illustrates cells 14 as being non-overlapping hexagonal shapes of equal size and without gaps therebetween. This hexagonal representation is convenient for schematically denoting a cell's area. Those skilled in the art will appreciate that the actual shape and size of cells 14 will vary from cell to cell, and that some overlap and gaps will appear between the cells 14.

FIG. 1 further illustrates a particular exemplary channel-to-cell assignment pattern for system 10. Those skilled in the art will appreciate that this particular assignment pattern need not actually be followed in any system 10. Each cell 14 has a channel set 16 assigned thereto. Each channel set 16 includes a potentially high quality group of channels 18 and a potentially low quality group of channels 20. Nothing requires any particular number of channels to be included in any potentially higher quality group of channels 18 or potentially lower quality group of channels 20. However, in the preferred embodiment a greater number of channels are included in potentially higher quality channel groups 18 than channels included in potentially lower quality channel groups 20, at least in larger urban areas. Likewise, nothing requires each channel group 18 or 20 to include precisely the same channels throughout system 10.

FIG. 1 depicts twenty-one different groups of potentially higher quality channels 18 distributed throughout system 10, and these channels 18 are referenced using alphabetic characters A–U. Nine different groups of potentially lower quality channels 20 are illustrated as being distributed throughout system 10, and these channels 20 are referenced using the Greek alphabetic characters: $\Gamma, \Delta, \Theta, \Lambda, \pi, \Sigma, Y, \Phi$ and $\Omega$.

Potentially higher quality channels 18 in one region of the area serviced by system 10 may also be potentially higher quality channels 18 in all regions of the service area. Likewise potentially lower quality channels 20 in one region tend to remain potentially lower quality channels 20 throughout the service area. While this assignment feature need not be followed as rigorously as illustrated in FIG. 1 for all channels, potentially lower quality channels 20 assigned at one land station 12 nevertheless desirably tend to be the same channels which are considered potentially lower quality channels 20 at other land stations 12 in the service area.

In the exemplary channel-to-cell assignment pattern illustrated in FIG. 1, potentially higher quality channels 18 have a greater reuse distance than potentially lower quality channels 20. Dotted lines 22 and 24 denote the reuse distances between potentially higher quality channel group "M" and potentially lower quality channel group "$\Sigma$," respectively. Nothing requires that higher or lower quality channel groups be assigned to cells to achieve any particular reuse distance. Rather, the relationship between reuse distances for potentially higher and lower quality channel groups simply tends to reflect the higher and lower potential quality achievable for the two diverse types of channel groups.

For each cell 14, the potentially higher quality group of channels 18 is distinguished from the potentially lower quality group of channels 20 through the use of a distinguishing feature 26, which FIG. 1 schematically depicts as a "/" character. The quality of channels included in each channel set 16 is considered to be a "potential" quality because it reflects potential interference. While many factors cooperate to cause interference, a primary factor is co-channel interference which results when the same channel simultaneously services two or more calls. So long as the two or more calls are sufficiently spaced apart, the interference is inconsequential. However, as the reuse distance shrinks between locations where the same channel is reused, interference increases.

Regardless of distances between cells where channels are assigned for use, if the channels are not used simultaneously no interference actually occurs. Hence, a priori channel quality characterizations used in assigning channels to cells describe only potential interference which will not be realized unless co-channels are actually used simultaneously. A communication session taking place using a potentially lower quality channel may actually experience less interference than another communication session which uses a potentially higher quality channel when no co-channel (i.e. the same channel assigned in a different location) is active for the potentially lower quality channel.

Figure 2:
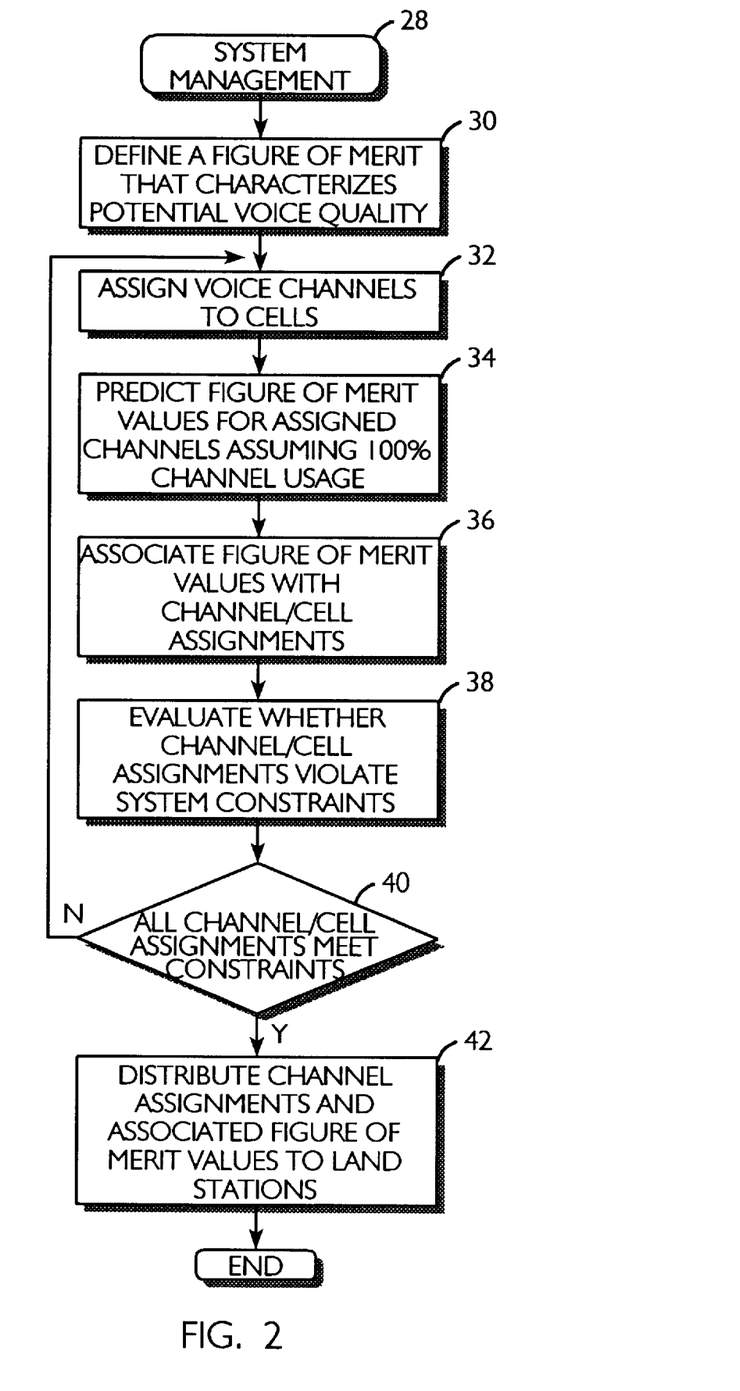
FIG. 2 shows a flow diagram of a system management process performed to assign channels to cells in the cellular system.

FIG. 2 shows a flow diagram of a system management process 28 performed to assign channels to cells in cellular system 10. System management process 28 is performed to assign channels to land stations 12 (see FIG. 1) for use in cells 14 (see FIG. 1). Process 28 may be performed through the operation of a general purpose computer, perhaps interactively with a computer operator.

Process 28 includes a task 30 in which a figure of merit is defined. The figure of merit defined in task 30 characterizes potential voice quality for a subject channel. As discussed above, voice quality is related to interference. Interference may or may not actually occur, depending in large part upon whether an interfering channel is actually placed in use simultaneously with a subject channel and upon the actual distances between interfering uses. In the preferred embodiment, a carrier-to-interference (C/I) ratio is defined in task 30. However, other figures of merit may be defined which characterize potential voice quality. For example, a bit or data error rate may be a useful figure of merit for a time division multiple access (TDMA) cellular system.

Following task 30, process 28 engages in an iterative channel-to-cell assignment process which repetitively performs various tasks. A task 32 is performed to set forth a channel assignment hypothesis which suggests a particular pattern in which voice channels are assigned to cells 14 (see FIG. 1). The particular assignment algorithm adopted in task 32 is not an important feature of the present invention, and conventional assignment algorithms may be used. Such algorithms may support a wide variety of conventional assignment schemes, such as fixed channel assignment (FCA), pure or hybrid forms of dynamic channel assignment (DCA), channel borrowing, and/or underlay/overlay schemes.

After task 32, a task 34 predicts figure of merit values for the assigned channels. The figure of merit values predicted in task 34 are based upon the assumption of 100% channel usage. As a minimum, each assigned channel is assumed to be simultaneously in use at all land stations 12 to which the channel was assigned above in task 32. The prediction may be performed using conventional techniques, including analysis, simulation, and measurements taken throughout system 10. The result of task 34 is different instantiations of the figure of merit defined above in task 30 for each assignment of a channel to a cell 14. For example, a number describing the decibels predicted for the C/I ratio is obtained for each channel/cell assignment.

Next, or in combination with task 34, a task 36 associates the figure of merit values with corresponding channel/cell assignments. The values may be associated by storing in an appropriate table in the memory of a computer. Following tasks 34 and 36, a task 38 evaluates whether the channel/cell assignments violate system constraints. With some exceptions, conventional constraints are contemplated in task 38. Thus, if hardware requirements impose adjacent channel constraints on the assignments, then task 38 incorporates such adjacent channel constraints. However, in the preferred embodiment, the figure of merit determined in tasks 34 and 36 is the primary constraint. When the figure of merit is instantiated with a value which exceeds a predetermined minimum voice quality prediction figure of merit, the associated channel/cell assignment is deemed to meet system constraints.

In conventional channel assignment schemes, a minimum acceptable C/I ratio is deemed to be around 18 dB in order to achieve acceptable voice quality. However, task 38 in the preferred embodiments desirably uses a significantly lower C/I ratio. For example, a minimum C/I ratio of around 12 dB may be used in the evaluation of task 38. Such a low C/I ratio depicts an unacceptably low quality voice signal in accordance with conventional standards. However, those skilled in the art will appreciate that the C/I ratios generated above in task 34 are mere predictions, not actual C/I ratios. The low C/I ratio predictions associated with some channel/cell associations will not be realized when co-channels are not active and when actual distances between usages of co-channels are larger than distances between competing cell sites.

In addition, task 38 may desirably limit the number of predicted potentially lower quality channels which get assigned to each cell. For example, channel/cell assignments having a figure of merit value less than a predetermined intermediate value may be considered potentially lower quality channels in the cell to which they have been assigned. The number of such channels may be limited so that fewer potentially lower quality channels than potentially higher quality channels are assigned in each cell. In the preferred embodiments, channels having a C/I ratio of, for example, greater than 18 dB may be considered potentially higher quality channels while channels having a C/I ratio of less than 18 dB may be considered potentially lower quality channels. The number of potentially lower quality channels may be limited to 3–8 channels for each 15–32 higher quality channels assigned in a cell, but this is not a requirement.

After the evaluations of task 38, a query task 40 determines whether all channel/cell assignments meet system constraints. So long as system constraints have not yet been met, program flow loops back to task 32. At task 32, voice channel assignments are revised to more closely converge upon the established system constraints. After several iterations of the loop which includes tasks 32, 34, 36, 38, and 40, a channel/cell assignment pattern is achieved which meets system constraints. This assignment pattern need not resemble the assignment pattern shown in FIG. 1. Channels need not be exclusively grouped together. Nothing requires all potentially higher quality and potentially lower quality channels 18 and 20 to remain exclusively higher quality and lower quality channels throughout the service area. However, it is desirable that potentially lower quality channels tend to be reused through the service area as potentially lower quality channels. This result is a natural outcome of most conventional channel assignment algorithms.

When task 40 eventually determines that all channel/cell assignments meet system constraints, a task 42 is performed. Task 42 distributes the channel assignments and associated figure of merit values to the corresponding land stations 12 throughout system 10. The figure of merit values may be indicated in association with the related channels in a variety of ways. For example, all channels being assigned to a particular land station 12 may be sorted in accordance with figure of merit values. This ranking need not be precise. The channel ranking may merely indicate which channels are potentially higher quality channels and which are potentially lower quality channels. All potentially higher quality channels may be deemed of roughly equal quality and all potentially lower quality channels may be deemed of roughly equal quality. Alternatively, each figure of merit value may be denoted to high precision and associated with its corresponding channel. The assigned channels may be ranked by figure of merit value regardless of whether a list conveying channel identities is sorted.

After task 42, system management process 28 ends. At this point, channels have been assigned to cells. Conventional FCA, DCA, channel borrowing, underlay/overlay, and other channel assignment schemes may be followed in the assignment performed by process 28. However, process 28 distributes associated figure of merit values with each channel assigned to a land station 12.

Figure 3:
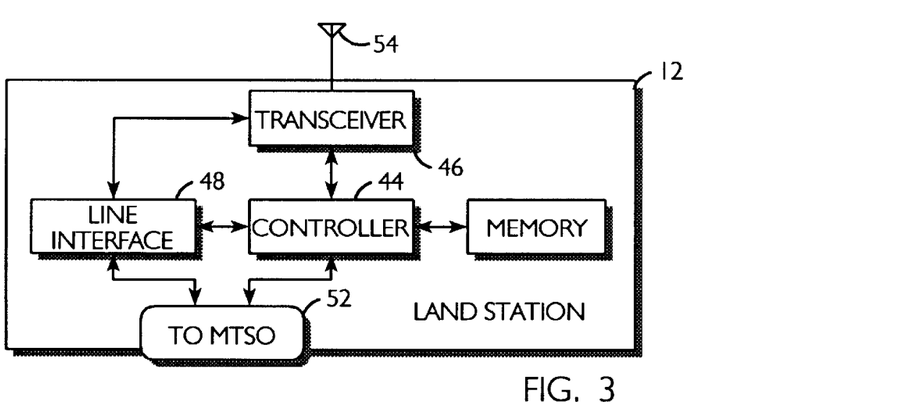
FIG. 3 shows a block diagram of hardware included at the land station.

FIG. 3 shows a block diagram of hardware included in a land station 12. Desirably, each land station 12 in system 10 resembles the block diagram depicted in FIG. 3. In general, land station 12 includes conventional hardware. For example, a controller 44 couples to a transceiver 46, a line interface 48, and a memory 50. Line interface 48 also couples to transceiver 46. Controller 44 and line interface 48 couple to a mobile telephone switching office (MTSO) through a port 52. Transceiver 46 communicates with cellular radio telephony equipment (not shown) through one or more antennas 54. It is controller 44 which controls the processes performed by land station 12. Controller 44 performs these processes in accordance with programming instructions stored in memory 50. In addition, memory 50 includes variables, tables, lists, and other memory structures which are used in the operation of land station 12.

Figure 4:
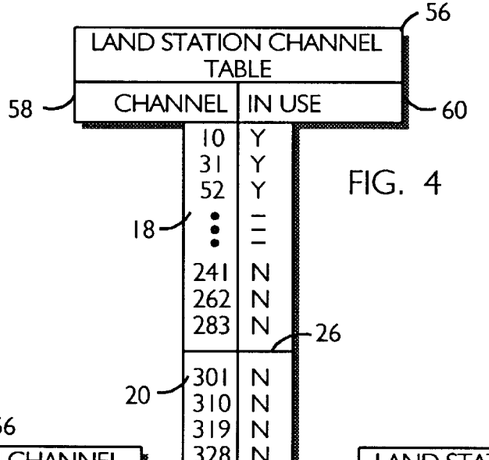
FIG. 4 shows a block diagram of an exemplary land station channel table formed at a cell site land station in response to the system management process, the table being illustrated in a first state.

The channel assignments distributed to land stations 12 in task 42 (see FIG. 2) may be stored as a memory structure in memory 50. FIG. 4 shows a block diagram of an exemplary land station channel table 56 formed at a cell site land station 12 to record channels assigned to the land station 12 and the cell 14 or cells 14 managed thereby. Table 56 includes a list 58 of identities for channels which have been assigned to the land station 12. In addition, table 56 includes a data element 60 in association with each channel identity. Data elements 60 indicate whether their associated channels are currently in use.

Of course, different channels are assigned to different land stations 12, but each land station 12 may have its own version of table 56. In the exemplary table 56 depicted in FIG. 4, channel identities are sorted to distinguish potentially higher quality channels 18 from potentially lower quality channels 20. An address, pointer, or other distinguishing programming feature 26 well known to those skilled in the art may serve to distinguish potentially higher from lower quality channels. In alternative embodiments, data elements (not shown) which are associated with channel identities in a one-to-one correspondence and which convey cardinal numbers or rank values may be included in table 56 to distinguish potentially higher from lower quality channels.

Figure 5:
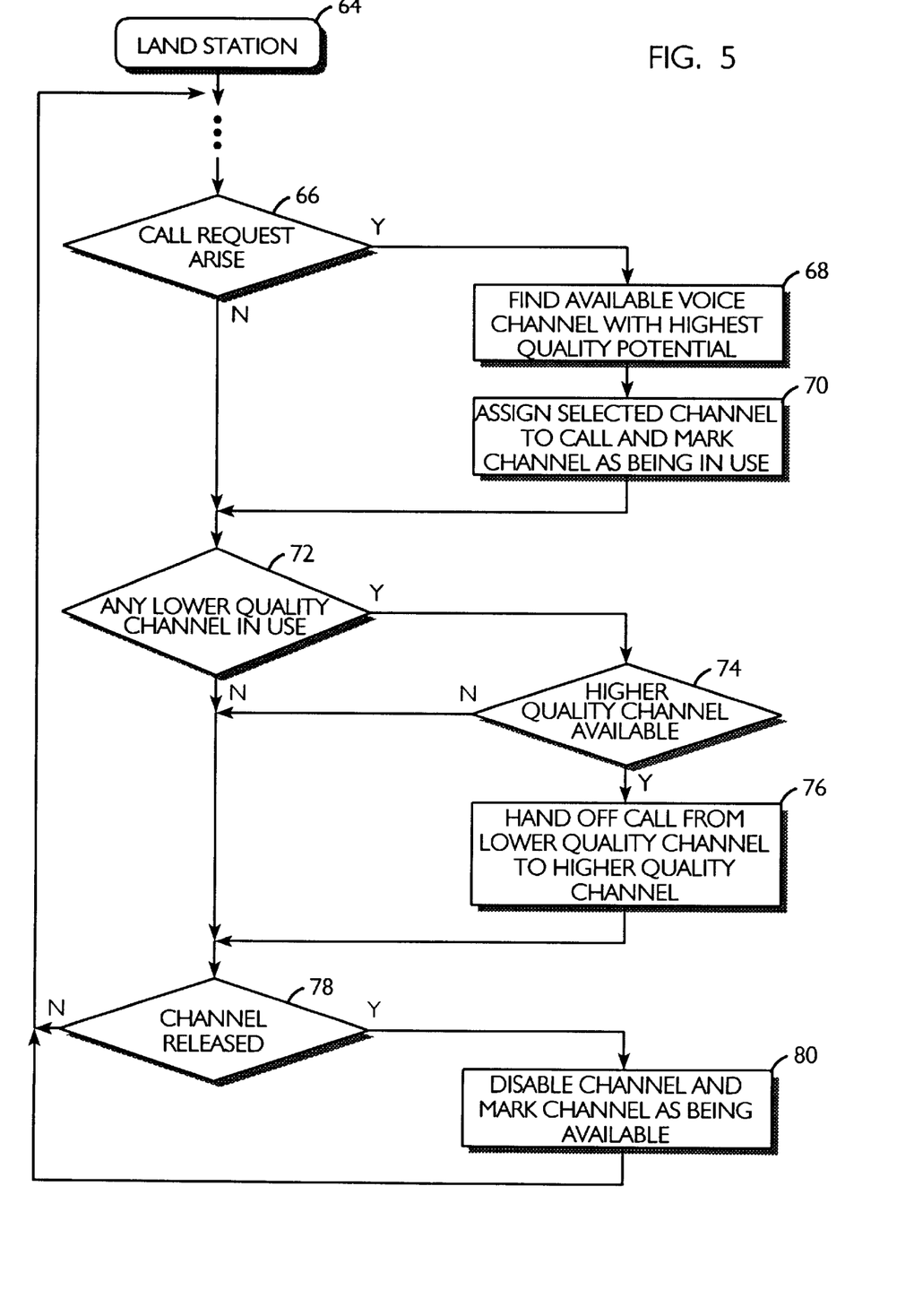
FIG. 5 shows a flow chart of a land station process performed at the land station.

FIG. 5 shows a flow chart of a land station process 64 performed at a land station 12. Desirably, all land stations in system 10 perform processes similar to process 64. Generally, process 64 assigns channels to calls.

Process 64 may include any number of tasks, indicated by ellipsis in FIG. 5, which are conventional in the art but not related to the present invention. Such tasks may relate to the broadcasting of overhead messages, the monitoring of overhead channels for pages sent by cellular telephony equipment, monitoring the line for incoming calls being set up to cellular telephony equipment, tracking call progress, and the like. Eventually, process 64 performs a query task 66. Task 66 determines whether a call request has arisen within the cell 14 being managed by land station 12. A call request arises, for example, when a call is being set up to cellular telephony equipment located in the cell 14 or when a call is being handed off to land station 12.

When task 66 determines that a call request has arisen, process 64 performs a task 68. Task 68 implements a portion of a call assignment algorithm which selects a channel to assign to the call that has arisen in cell 14. In the preferred embodiment, task 68 finds the available voice channel with the highest quality potential. Task 68 may be performed by evaluating table 56 (see FIG. 4). Available channels are channels which are not in use at the instant task 68 is performed. As discussed above, nothing requires distinguishing feature 26 (see FIGS. 1 and 4) to do more than distinguish potentially higher quality channels 18 from potentially lower quality channels 20. Accordingly, any available potentially higher quality channel 18 assigned to land station 12 may be selected in task 68. For the exemplary channel-to-call assignment state depicted in FIG. 4, any of channels 241, 262, or 283 may be selected in task 68 because these are the highest quality channels indicated in table 56, and these channels are indicated as being available at the instant task 68 is performed.

The precise call assignment algorithm followed in task 68 may vary from system to system. As a minimum, the call assignment algorithm assigns potentially higher quality channels 18 to calls before assigning potentially lower quality channels 20. In other words, the call assignment algorithm desirably makes the potentially lower quality channels 20 the least used channels at land station 12. In the preferred embodiment, potentially lower quality channels 20 are assigned to calls only when all potentially higher quality channels 18 assigned to land station 12 are currently in use at the instant the call assignment algorithm is performed.

Peak call traffic tends to occur in different cells within a cellular system at different times. In accordance with the preferred embodiments of the present invention, all cells follow a similar channel-to-call assignment algorithm which makes potentially lower quality channels 20 the least used channels in each cell. Desirably, potentially lower quality channels 20 are used only during times of peak traffic. They may be viewed as overflow channels for the land station 12 to be used when potentially higher quality channels 18 are not available for use. If the potentially lower quality channels 20 were not available, new call requests would be blocked.

However, the use of a "potentially" low quality channel 20 does not mean that low quality communication services will be realized. As discussed above, channel-to-cell assignment algorithms tend to make potentially lower quality channels 20 at one land station 12 potentially lower quality channels 20 at a plurality of land stations 12 within system 10. The channel-to-call assignment algorithm performed at other land stations 12 makes actual usage of the same but potentially interfering channels at other land stations 12 unlikely. Accordingly, the probability of actually providing low quality service is extremely low, and the overall service provided by system 10 is only deteriorated by an insubstantial amount.

Figure 6:
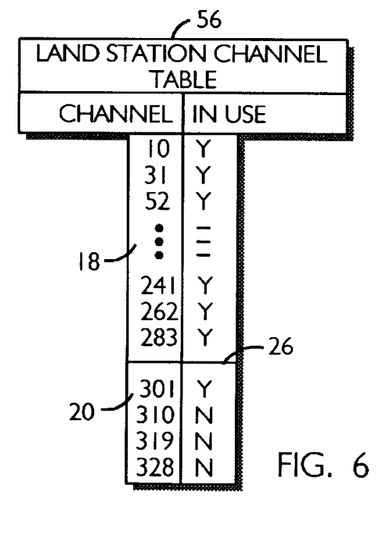
FIG. 6 shows a block diagram of the land station channel table in a second state.

After task 68, a task 70 assigns the selected channel to the call and updates table 56 to mark the selected channel as being in use. The selected channel may be marked as being in use by appropriate manipulation of a data element 60 (see FIG. 4). FIG. 4 depicts an exemplary channel-to-call assignment state in which tasks 68 and 70 will assign a potentially higher quality channel 18 to a call. In contrast, FIG. 6 depicts an exemplary channel-to-call assignment state in which tasks 68 and 70 will assign a potentially lower quality channel 20 to a call. As depicted in FIG. 6, all potentially higher quality channels 18 are in use.

After task 70 or when task 66 determines that no calls have arisen in cell 14, process 64 performs a query task 72. Task 72 determines whether any potentially lower quality channels 20 are currently in use. Task 72 may be performed by evaluating table 56. If a potentially lower quality channel 20 is discovered to be in use, a query task 74 is performed. Task 74 determines whether any potentially higher quality channels 18 are available while a potentially lower quality channel 20 is in use. Task 74 may be performed by evaluating table 56.

Figure 7:
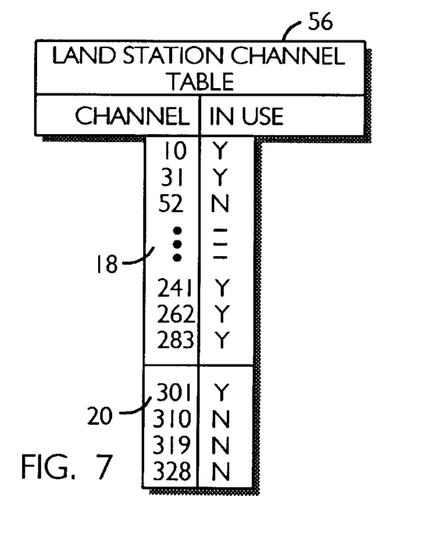
FIG. 7 shows a block diagram of the land station channel table in a third state.

FIG. 7 depicts an exemplary channel-to-call assignment state in which task 74 may discover that a potentially higher quality channel 18 has become available. Specifically, in FIG. 7 table 56 reveals that potentially higher quality channel number 52 is not in use. The call to which this potentially higher quality channel was previously assigned may have been handed off or terminated within the recent past. When a potentially higher quality channel has been discovered to be available, a task 76 is performed. Task 76 hands off a call from a potentially lower quality channel 20, such as channel number 301 in FIG. 7, to a potentially higher quality channel 18, such as channel number 52 in FIG. 7.

Tasks 74 and 76 cooperate to limit the amount of time for which potentially lower quality channels 20 are in use. Accordingly, the unlikely event of a potentially lower quality channel 20 actually being in use when the same channel is needed in another cell is even less likely because such use is limited to being a minimum amount of time through the operation of tasks 74 and 76.

In rare situations a service provider may assign a call to a channel which will have what is deemed to be unacceptable quality because the co-channel is in use nearby. However, the quality should improve within a few seconds because either the interfering call or this call will be handed off to a higher quality channel as soon as possible. The preferred embodiments desirably avoid measurements which might confirm acceptably low levels of interference in a channel before assigning a call to the channel. Even if measured interference were deemed unacceptably high, the preferred embodiment of the present invention would assign the channel to the call, and the interference would most likely cease in a few seconds.

When task 72 determines that no potentially lower quality channel 20 is in use, when task 74 determines that no potentially higher quality channel 18 is available, or when task 76 is complete, program control proceeds to a query task 78. Task 78 determines whether a channel has just been released. A channel may be released when a call terminates or when a call has been successfully handed off to another cell 14. If a channel has just been released, a task 80 disables usage of the channel at land station 12 and marks the channel as being available. The newly released channel may be marked as being available by an appropriate data manipulation in table 56 (see FIGS. 4, 6, and 7).

After task 80 or when task 78 fails to detect a just-released channel, program flow loops back to an entry point into land station process 64. By continued operation of process 64 in all land stations 12 within a cellular system 10, potentially lower quality channels 20 are assigned to calls only during peak traffic times. Since peak traffic tends to occur in different cells 14 at different times, chances are that a potentially lower quality channel 20 will not actually be in use in nearby cells when it is needed. Accordingly, the potential for lower quality communication service is unlikely to be realized. Moreover, calls are maintained on potentially lower quality channels 20 for the minimum amount of time necessary thereby further limiting the likelihood that lower quality communication service will be realized and limiting the time for which lower quality service is provided.

In rare situations, potentially lower quality channels 20 are simultaneously used in nearby cells 14. While a greater amount of interference than normal may be experienced in these rare situations, the result is preferred over blocking or dropping the call, particularly when the interference is highly likely to cease within a few seconds. In short, the quality of service for the rare situation where a call experiences slightly increased interference is still better than the quality of service which results from a blocked or dropped call.

In summary, the present invention provides a cellular communication system in which voice channel usage is biased to favor potentially higher quality channels over potentially lower channels. As a result, when high traffic demands the use of potentially lower quality channels, the "potential" for lower quality service is unlikely to be realized. Significant spectral usage efficiency is achieved over that achieved by FCA. Potentially lower quality channels which would not be assigned in accordance with conventional channel assignment schemes are assigned to calls from time to time. In situations of higher communication traffic, the cellular system gracefully degrades communication service by minute amounts rather than simply blocking or dropping calls. An increased amount of call traffic is handled with an insubstantial degradation in service quality because degraded service occurs only rarely.

The present invention has been described above with reference to preferred embodiments. However, those skilled in the art will recognize that changes and modifications may be made in these preferred embodiments without departing from the scope of the present invention. For example, those skilled in the art will appreciate that the precise task and process organization discussed herein may be substantially altered while achieving equivalent results. These and other changes and modifications which are obvious to those skilled in the art are intended to be included within the scope of the present invention.

What is claimed is:

1. In a cellular communication system which includes land stations, each of said land stations having a cell associated therewith, and which manages a plurality of voice channels that are assigned to calls as call requests arise, a method of biasing voice channel usage comprising the steps of:

a) determining a channel-to-cell assignment pattern in which subsets of said voice channels are allocated to said land stations;

b) predicting a figure of merit value for each of said allocated voice channels, said predicted figure of merit value characterizing a potential voice quality for said each of said allocated voice channels;

c) assigning said subsets of said voice channels to said land stations in response to said channel-to-cell assignment pattern when said figure of merit values exceed a predetermined minimum figure of merit threshold value;

d) distinguishing, prior to receipt of said call requests and for each of said subsets, ones of said voice channels having potentially higher voice quality from ones of said voice channels having potentially lower voice quality in response to said predicted figure of merit values; and e) assigning said voice channels having potentially higher voice quality to said calls as said call requests arise at said land stations before assigning said voice channels having potentially lower voice quality to said calls.

2. A method as claimed in claim 1 wherein said step b) comprises the steps of:

defining a figure of merit;

simulating a situation in which said voice channels are in use at all of said land stations to which said voice channels have been allocated; and determining said figure of merit value for each of said allocated voice channels in response to said simulating step, said figure of merit value instantiating said figure of merit for each of said voice channels.

3. A method as claimed in claim 2 wherein said figure of merit is a carrier-to-interference (C/I) ratio, and said figure of merit value is a predicted C/I ratio value responsive to said simulating step.

4. A method as claimed in claim 1 wherein said step c) comprises the steps of:

identifying each predicted figure of merit value which is below said predetermined minimum figure of merit threshold value; and repeating said steps a) and b) in response to said identifying step.

5. A method as claimed in claim 4 wherein said predetermined minimum figure of merit threshold value is a minimum C/I ratio value.

6. A method as claimed in claim 5 wherein said minimum C/I ratio value is approximately twelve decibels.

7. A method as claimed in claim 1 wherein said step d) comprises the steps of:

establishing an intermediate threshold value, said intermediate threshold value being greater than said predetermined minimum figure of merit threshold value;

classifying ones of said voice channels having said figure of merit value that exceeds said intermediate threshold value as having said potentially higher voice quality; and classifying ones of said voice channels having said figure of merit value that is below said intermediate threshold value as having said potentially lower voice quality.

8. A method as claimed in claim 1 wherein said method further comprises the step of configuring each of said subsets of said voice channels to include more of said voice channels with said potentially higher voice quality than said voice channels with said potentially lower voice quality.

9. A method as claimed in claim 1 wherein said voice channels having said potentially lower voice quality are distinguished as potentially lower voice quality channels for all of said plurality of land stations.

10. A method as claimed in claim 1 wherein said step b) comprises the step of associating said predicted figure of merit value with a corresponding one of said allocated voice channels.

11. A method as claimed in claim 10 wherein said step c) comprises the step of distributing said allocated subsets of said voice channels with said associated predicted figure of merit values to said land stations.

12. A method as claimed in claim 10 wherein said step d) comprises the step of sorting said voice channels, for each of said subsets of said voice channels, in accordance with said predicted figure of merit value to establish a ranking of said voice channels, said ranking indicating which of said voice channels have said potentially higher voice quality.

13. A method as claimed in claim 1 wherein said step e) assigns said voice channels having said potentially lower voice quality to said calls as said call requests arise at one of said land stations when all of said voice channels having said potentially higher voice quality channels assigned to said one land station are already assigned to calls at the instant step e) is performed.

14. A method as claimed in claim 1 wherein said step e) comprises the step of following a channel-to-call assignment algorithm which makes said voice channels having said potentially lower voice quality the least used ones of said voice channels assigned to said land stations in said step c).

15. A method as claimed in claim 1 wherein said method further comprises the steps of:

determining when one of said voice channels having said potentially higher voice quality is available to be assigned a call as said call requests arise; and handing off an established call to said one potentially higher voice quality channel in response to said determining step, said established call being previously assigned to one of said voice channels having said potentially lower voice quality in response to receipt of one of said call requests in step e).

16. In a cellular communication system which includes land stations, each of said land stations having a cell associated therewith, and which manages a plurality of voice channels that are assigned to calls as call requests arise, a method of biasing voice channel usage comprising the steps of:

a) determining a channel-to-cell assignment pattern in which subsets of said voice channels are allocated to said land stations;

b) simulating a situation in which said voice channels are in use at all of said land stations to which said voice channels have been allocated;

c) predicting a carrier-to-interference (C/I) ratio value for each of said allocated voice channels in response to said step b), said predicted C/I ratio value instantiating a potential voice quality for said each of said allocated voice channels;

d) assigning said subsets of said voice channels to said land stations in response to said channel-to-cell assignment pattern when each said predicted C/I ratio value exceeds a predetermined minimum C/I ratio threshold value;

e) distinguishing, prior to receipt of said call requests and for each of said subsets, ones of said voice channels having potentially higher voice quality from ones of said voice channels having potentially lower voice quality in response to said each predicted C/I ratio value; and f) assigning said voice channels having said potentially lower voice quality to said calls as said call requests arise at said land stations when all of said voice channels having said potentially higher voice quality are already assigned to calls at the instant step g) is performed.

17. A method as claimed in claim 16 wherein said step c) comprises the steps of:

identifying each predicted C/I ratio value which is below said predetermined minimum C/I ratio threshold value; and repeating said steps a) and c) in response to said identifying step.

18. A method as claimed in claim 16 wherein said method further comprises the steps of:

determining when one of said voice channels having said potentially higher voice quality is available to be assigned a call as said call requests arise; and handing off an established call to said one potentially higher voice quality channel in response to said determining step, said established call being previously assigned to one of said voice channels having said potentially lower voice quality in response to step f).

19. In a cellular communication system which includes land stations, each of said land stations having a cell associated therewith, and which manages a plurality of voice channels that are assigned to calls as call requests arise, a channel-to-cell assignment method for biased usage of said voice channels comprising the steps of:

a) determining a channel-to-cell assignment hypothesis in which subsets of said voice channels are allocated to said land stations;

b) predicting a figure of merit value for each of said allocated voice channels, said predicted figure of merit value characterizing a potential voice quality for said each of said allocated voice channels;

c) verifying that each said predicted figure of merit value exceeds a predetermined minimum figure of merit threshold value;

d) establishing an intermediate threshold value, said intermediate threshold value being greater than said predetermined minimum figure of merit threshold value;

e) distinguishing, for each of said subsets, those of said voice channels having said figure of merit value that exceeds said intermediate threshold value as being potentially higher voice quality channels from others of said voice channels having said figure of merit value that is below said intermediate threshold value as being potentially lower voice quality channels;

g) associating said predicted figure of merit value with a corresponding one of said allocated voice channels; and h) distributing said allocated subsets of said voice channels with said associated predicted figure of merit values to said land stations.

20. A method as claimed in claim 19 further comprising the step of assigning said potentially higher voice quality channels to said calls as said call requests arise at said land stations before assigning said potentially lower voice quality channels to said calls.

21. A method as claimed in claim 20 further comprising the step of following a channel-to-call assignment algorithm which makes said potentially lower voice quality channels the least used ones of said voice channels distributed to said land stations.

\* \* \* \* \*